C. J. CLEFTON.
COOKING UTENSIL.
APPLICATION FILED JULY 25, 1919.

1,389,241.  
Patented Aug. 30, 1921.

Inventor  
Claud J. Clefton  
By Paul Paul  
his Attorneys.

UNITED STATES PATENT OFFICE.

CLAUD J. CLEFTON, OF OWATONNA, MINNESOTA, ASSIGNOR, BY MESNE ASSIGNMENTS, OF ONE-HALF TO GUY J. CLEFTON, OF OWATONNA, MINNESOTA.

COOKING UTENSIL.

1,389,241.   Specification of Letters Patent.   Patented Aug. 30, 1921.

Application filed July 25, 1919. Serial No. 313,349.

*To all whom it may concern:*

Be it known that I, CLAUD J. CLEFTON, a citizen of the United States, resident of Owatonna, county of Steele, State of Minnesota, have invented certain new and useful Improvements in Cooking Utensils, of which the following is a specification.

In cooking articles of food it is desirable to provide a supply of water in the bottom of the utensil and to obtain the best results this water supply should be maintained at a predetermined level. Evaporation is constantly taking place during the cooking process and unless great care is exercised, the utensil will boil dry to the damage of both the utensil and the food, and this difficulty cannot very well be obviated by increasing the normal supply of water in the utensil. At least the best cooking results cannot be obtained by so doing.

The object, therefore, of my invention is to provide an attachment for the utensil which will automatically feed water thereto as fast as it becomes evaporated and falls below a certain predetermined level in the cooker.

The invention consists generally in various constructions and combinations, all as hereinafter described and particularly pointed out in the claims.

In the accompanying drawings forming part of this specification,

Figure 1:
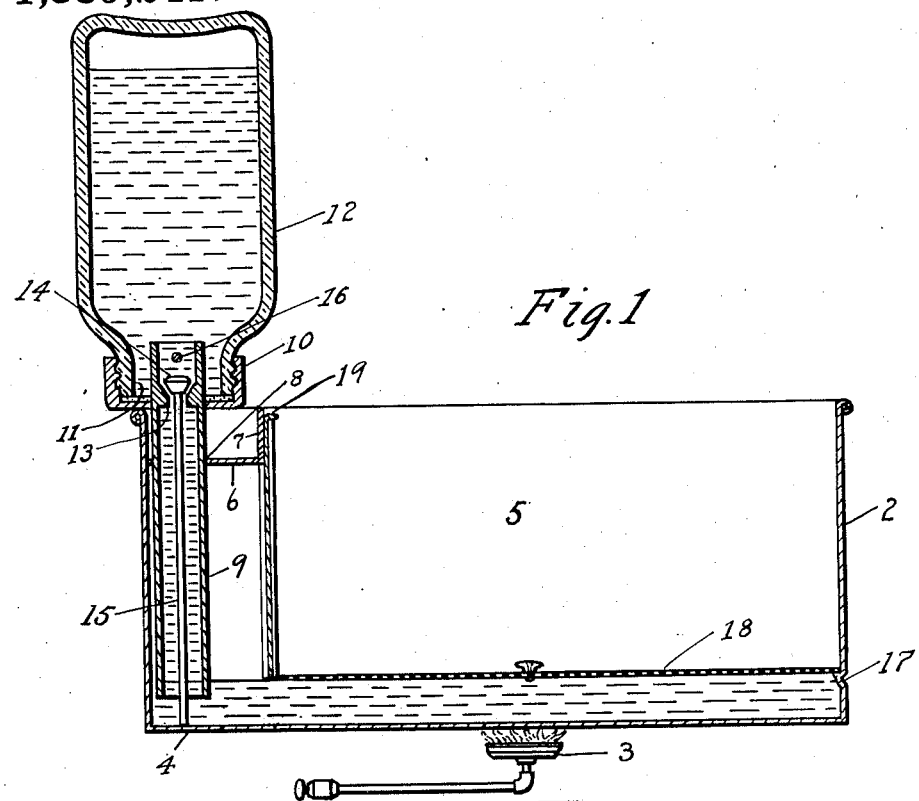
Figure 1 is a vertical sectional view through a cooker and attachment embodying my invention, on the line 1—1 of Fig. 2.
Figure 2:
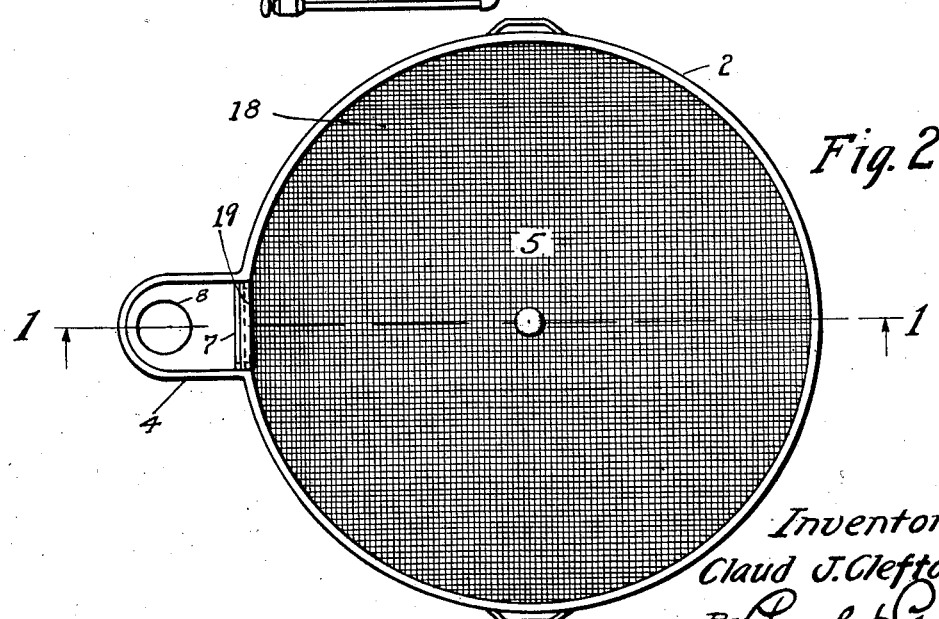
Fig. 2 is a plan view of the same, with water reservoir removed.

In the drawing, 2 represents a cooking utensil of suitable size and shape and 3 the burner over which the utensil is placed. 4 represents a lateral extension communicating with the main chamber 5 of the utensil so that the water in said main chamber may flow into the extension and in practice this extension will preferably be formed in the wall of the utensil by bending it outwardly to the desired shape. A horizontal wall 6 is preferably formed near the top of the extension and a wall 7 forms a continuation of the curvature of the main wall of the utensil and braces the upper portion of the extension and the horizontal wall 6. This wall 6 has an opening 8 therein. 9 is a tube that is mounted in a cap 10 that is interiorly threaded to receive the neck 11 of the water bottle 12 that is inverted and inserted into the cap, the end of the tube 9 projecting through the cap and up through the neck of the bottle and being open to allow the water in the bottle to flow down through the tube into the chamber 5. A valve seat 13 is formed in the tube 9 and a valve 14 having a stem 15 is mounted in said tube, the surface of the valve being tapered to fit the taper of the seat 13 and normally close the passage through the tube when the bottle is raised and inverted. When the bottle is mounted on the utensil, and the tube thrust into the opening 8, the stem, contacting with the bottom of the utensil, opens the valve and allows the water to flow freely from the bottle down into the chamber and maintain the desired level in the utensil. A pin 16 is preferably mounted in the upper end of the tube 9, forming a stop to limit the movement of the valve.

It will be noted that the valve is free to rise and fall in the tube, the seat forming a stop in one direction and the pin in the other direction. Normally the lower end of the tube will be immersed in the water in the cooking chamber and as soon as this level falls below the end of the tube the water will flow automatically from the bottle and continue to flow until the desired level is reached. In this way loss of water in the utensil by evaporation is taken care of and the person in charge of the cooking may light the burner and leave the utensil without any attention, knowing that all the loss of water will be automatically renewed.

To fill the bottle, it may be unscrewed from the cap 10 or the cap and tube may, with the bottle, be removed from the utensil and the bottle filled through the tube. The wall of the utensil is preferably provided with a rib or crimp 17 and I prefer to provide a perforated disk or screen 18 separating the upper portion of the chamber 5 from the lower portion thereof where the body of the water is contained. This screen prevents articles of food from working down into the bottom of the utensil and clogging the passage from the tube 9. At the opening leading to the extension 4 I prefer to provide a slide 19 also separating the chamber 5 from the space inclosed by the walls of the extension. This slide coöperates with the screen to prevent the food contained in the chamber 5 from interfering with the feed of the water from the bottle.

I claim as my invention:

1. The combination, with a kitchen utensil having a lateral extension and adapted to contain a supply of water, said extension having a horizontal wall therein provided with an opening, a tube fitting within said opening and open at the top and bottom, a valve mounted in said tube and adapted to be opened when the tube is inserted into the utensil, a cap mounted on the upper portion of said tube and a water bottle having an exteriorly threaded neck for fitting into said cap.

2. A cooking utensil having a lateral extension in its wall and a slide separating said extension from the cooking chamber, a screen provided in the lower portion of said cooking chamber, said utensil being adapted to contain a supply of water below said screen, and water container having a pipe connection with the lower portion of said utensil and adapted to automatically deliver water thereto when the supply of water in the utensil drops below a predetermined point.

3. The combination, with a kitchen utensil having an extension formed thereon, a tube mounted in said extension, a valve mounted in said tube and adapted to be opened when the tube is inserted into the utensil, a water bottle having a neck adapted to receive the upper end of said tube for automatically feeding water to said utensil through said tube when the valve therein is opened.

In witness whereof I have hereunto set my hand this 5" day of July, 1919.

CLAUD J. CLEFTON.